(12) United States Patent
Herrmann et al.

(10) Patent No.: US 7,023,823 B2
(45) Date of Patent: Apr. 4, 2006

(54) WIRELESS NETWORK WITH CAPACITY MEASUREMENT

(75) Inventors: Christoph Herrmann, Aachen (DE); Josef Wasel, Bedburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 776 days.

(21) Appl. No.: 09/855,577

(22) Filed: May 15, 2001

(65) Prior Publication Data

US 2001/0055275 A1 Dec. 27, 2001

(30) Foreign Application Priority Data

May 19, 2000 (DE) .................. 100 24 153

(51) Int. Cl.
*H04Q 7/24* (2006.01)
*H04L 12/28* (2006.01)

(52) U.S. Cl. ............... 370/335; 370/338; 370/412; 375/142

(58) Field of Classification Search .............. 370/329, 370/412, 417, 418, 429, 461, 526; 375/342, 375/343, 356, 143, 152; 455/450, 452.1
See application file for complete search history.

(56) References Cited

U.S. PATENT DOCUMENTS

| | | | | |
|---|---|---|---|---|
| 5,428,647 A * | 6/1995 | Rasky et al. | ................ | 375/366 |
| 5,790,534 A * | 8/1998 | Kokko et al. | ................ | 370/335 |
| 6,243,372 B1 * | 6/2001 | Petch et al. | ................ | 370/350 |
| 6,363,060 B1 * | 3/2002 | Sarkar | ................ | 370/342 |
| 6,408,005 B1 * | 6/2002 | Fan et al. | ................ | 370/412 |
| 6,546,062 B1 * | 4/2003 | Du et al. | ................ | 375/342 |

FOREIGN PATENT DOCUMENTS

EP 0967742 A1 12/1999

OTHER PUBLICATIONS

Ericsson, Entitled: "Usage of Radio Access Bearer Control Procedures" TSG-RAN Working Group 2 (Radio Layer 2 and Radio Layer 3) Stockholm, Mar. 8-11, 1999, pp. 1-10.
$3^{RD}$ Generation Partnership Project; Technical Specification Group Radio Access Network; Physical Channels and Mapping of Transport Channels onto Physical Channels (FDD) (3G TS 24.211 Version 3.1.0) Technical Specification3G TS 25.211 V3.1.1 (Dec. 1999). pp. 1-37.

* cited by examiner

*Primary Examiner*—Chau Nguyen
*Assistant Examiner*—Soon D. Hyun

(57) ABSTRACT

The invention relates to a wireless network comprising a radio network controller (1) and a plurality of assigned terminals (2 to 9) for exchanging useful data and control data, which terminals respectively have a buffer for buffering data packets to be transmitted to the radio network controller (1) via a contention channel, and a measuring device for measuring the occupancy level of at least one buffer. A terminal (2 to 9) is provided for transmitting a signaling sequence at a start time respectively predefined by the radio network controller (1) when an occupancy threshold of a buffer or various buffers is exceeded. The radio network controller (1) includes a device for correlating a signaling sequence sent by a terminal (2 to 9) and for detecting the pulse developed from a received and correlated signaling sequence. After a signaling sequence assigned to a terminal (2 to 9) has been detected, the radio network controller (1) sends an indication to the terminal (2 to 9) that the data packets are further transmitted over a channel assigned only to the terminal (2 to 9).

10 Claims, 3 Drawing Sheets

WIRELESS NETWORK WITH CAPACITY MEASUREMENT

Figure 1:
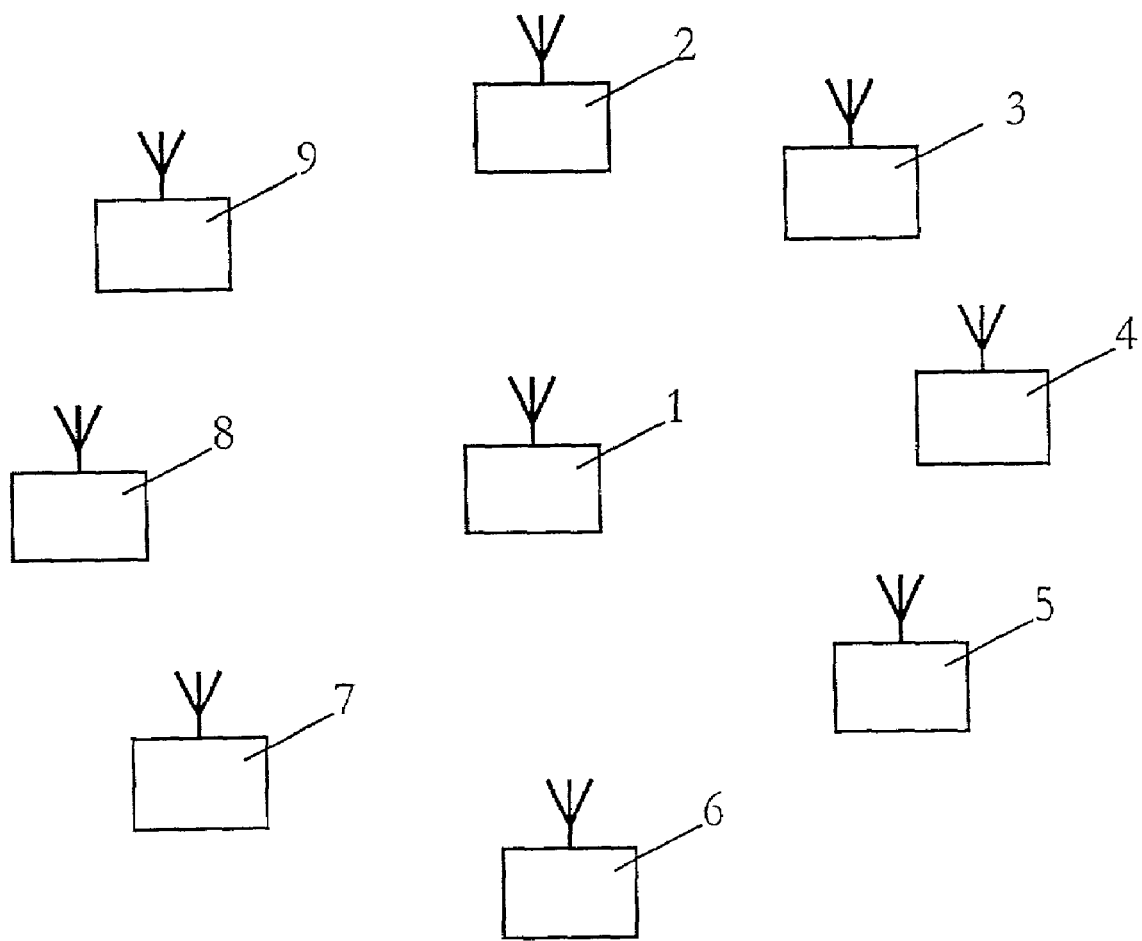

The invention relates to a wireless network comprising a radio network controller and a plurality of assigned terminals for exchanging useful data and control data, which terminals respectively have a buffer for buffering data packets to be transmitted to the radio network controller via a contention channel and a measuring device for measuring the occupancy level of at least one buffer.

In the document "3$^{rd}$ Generation Partnership Project; 3G TS 25.301 version 3.4.0, Radio Interface Protocol Architecture" is known a wireless network comprising a radio network controller and a plurality of terminals. In a terminal are measured the occupancy levels (in accordance with 3G TS 25.331, version 3.2.0, RRC Protocol Specification, section 14.4) in buffers of the RLC layer (RLC=Radio Link Control) and when a threshold value is exceeded, a message is sent over a contention channel (RACH) to the radio network controller. The radio network controller then informs the respective terminal that it must not send future data packets over the contention channel but over a dedicated channel (user channel). The message about the reaching of the occupancy level comprises various bytes and means an additional traffic load of the contention channel.

It is an object of the invention to provide a wireless network in which the traffic load is spread more evenly.

The object is achieved by a wireless network of the type defined in the opening paragraph, in that a terminal, when an occupancy level of a buffer or various buffers is exceeded, is provided for sending a signaling sequence at a start time predefined by the radio network controller, in that the radio network controller includes a device for correlating the signaling sequence sent by a terminal and for detecting a pulse developed from a received and correlated signaling sequence and in that the radio network controller, after detecting a signaling sequence assigned to a terminal, is arranged for sending an indication to the terminal to further transmit the data packets over a channel assigned only to the terminal.

The wireless network according to the invention is understood to mean a network having at least one radio cell, in which a radio network controller and a plurality of terminals respectively, transmit control and useful data. A wireless transmission is used for transmitting data, for example, via radio, ultrashell or infrared links.

The signaling channel unambiguously determined by a signaling sequence and a send time can be assigned to a buffer in a terminal, to exactly indicate the exceeding of a predefined occupancy level in this buffer. A simpler way is to have the radio network controller assign a single signaling channel to a terminal, so that the terminal indicates the exceeding of the occupancy level threshold of at least one buffer, or the sum of the occupancy levels of all the buffers over this signaling channel. The transmission of a signaling sequence may be considered a traffic load message. Due to an indication of the radio network controller, a terminal carries on with the further data transmission on another channel which may be loaded less (more particularly, a dedicated channel).

The advantage of the use of the exclusive signaling channel determined by signaling sequence and send time for announcing an exceeding of the threshold lies in the fact that clearly fewer data are to be sent to the radio network controller. Since the signaling channel is exclusively assigned to one terminal, there is no need to co-transmit certain data in a traffic load message (for example, an identification for the transmitting terminal), which is different from the use of the contention channel. Determined by the fixed number of bits that can be transmitted on the contention channel when the possible spreading factors are used and which usually do not exactly correspond to the number of bits that are actually to be transmitted, it is usually necessary to co-transmit useless stuff bits with the measuring value for the message, which stuff bits complement the number of bits actually to be transmitted to the number of bits that the contention channel is capable to transmit with a given spreading factor. This reduction of the data to be transmitted reduces the interference occurring in a cell. Furthermore, the use of the exclusively assigned signaling channel means a reduction of interference because no data can be lost due to collisions, which can, however, in the contention channel. This particularly adds to a faster signaling of the exceeding of the threshold which, in its turn, has a favorable effect on the efficient use of available radio resources. Particularly with traffic profiles that have strong variations of the data rate, but an average data rate that can basically still be transmitted over the contention channel, there are frequently occurring traffic load messages, which then also lead to a frequent access to the contention channel and thus a data loss owing to collisions.

The correlation and detection of a received signaling sequence which may be, for example, a gold, Gold, Kasami or Golay sequence.

A terminal may also transmit a signaling sequence when a certain sum of the occupancy levels of all the buffers exceed a threshold. After a change-over has been made from the contention channel to a channel assigned only to the terminal, further information about the traffic load of the terminal can be transmitted over this user channel.

The invention further relates to a radio network controller, to a terminal and to a method of exchanging useful data and control data in a wireless network.

These and other aspects of the invention are apparent from and will be elucidated with reference to the embodiments described hereinafter.

Figure 2:
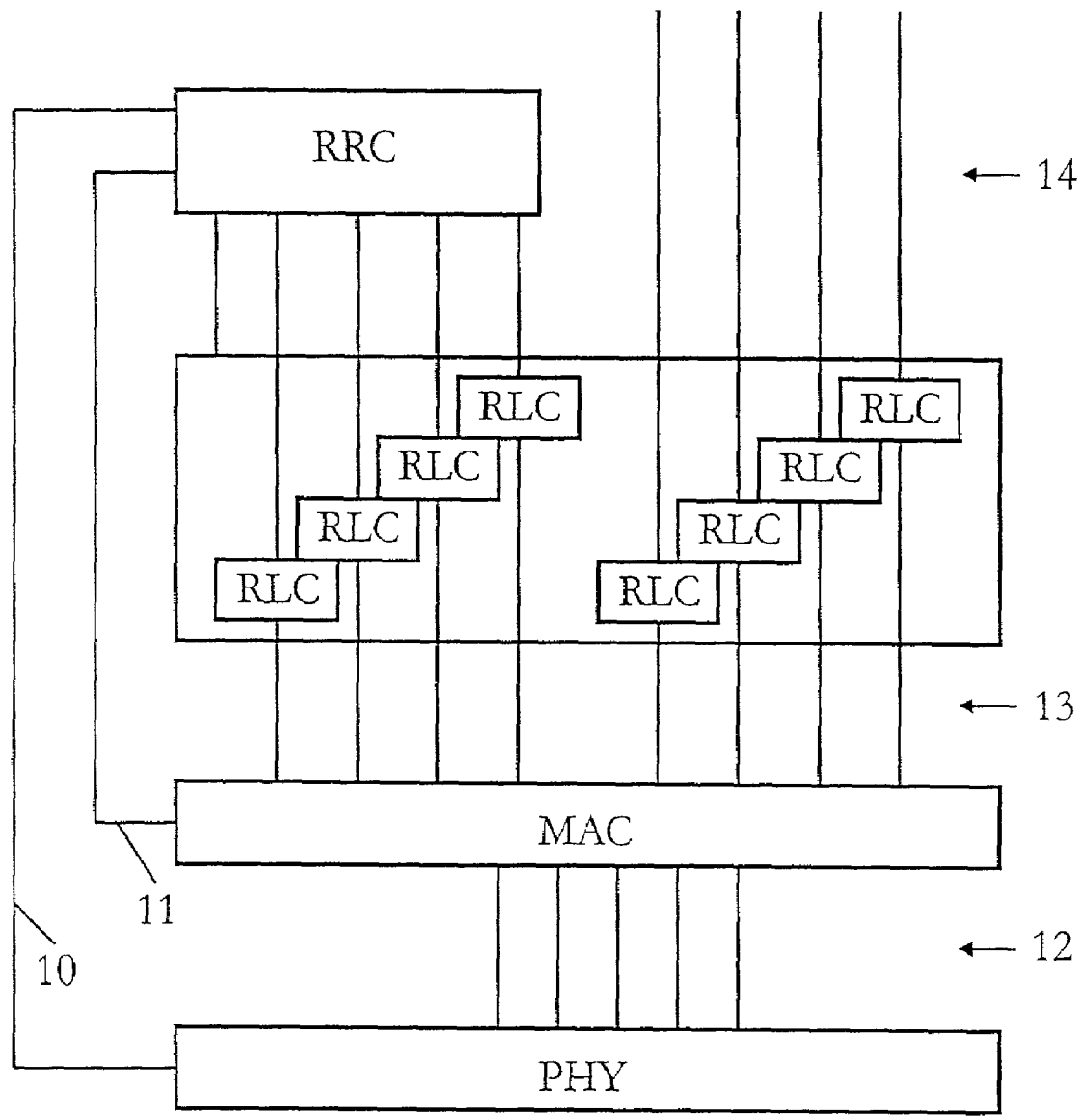
Figure 3:
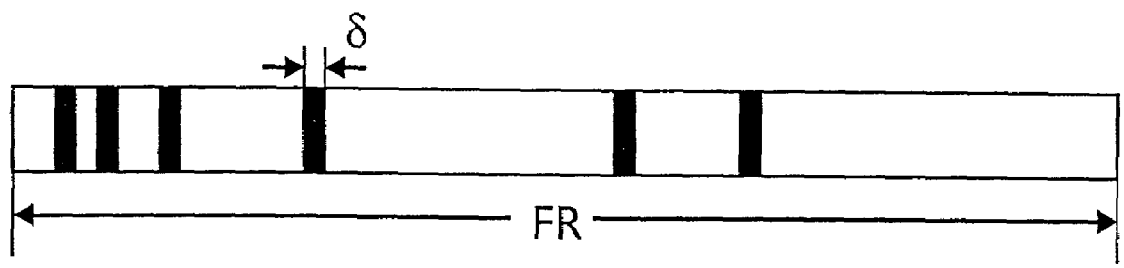
Figure 4:
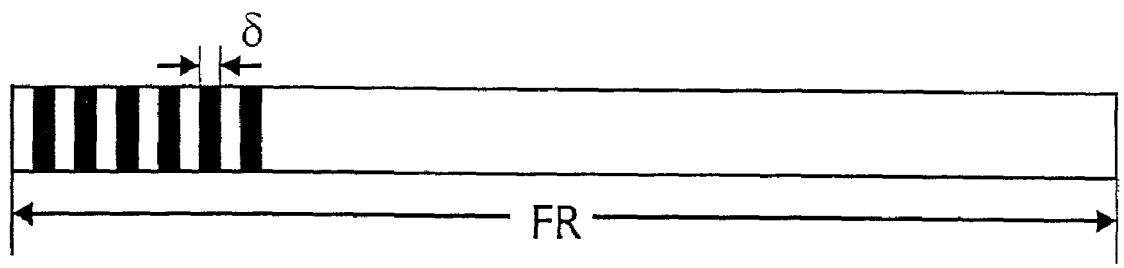
Figure 5:
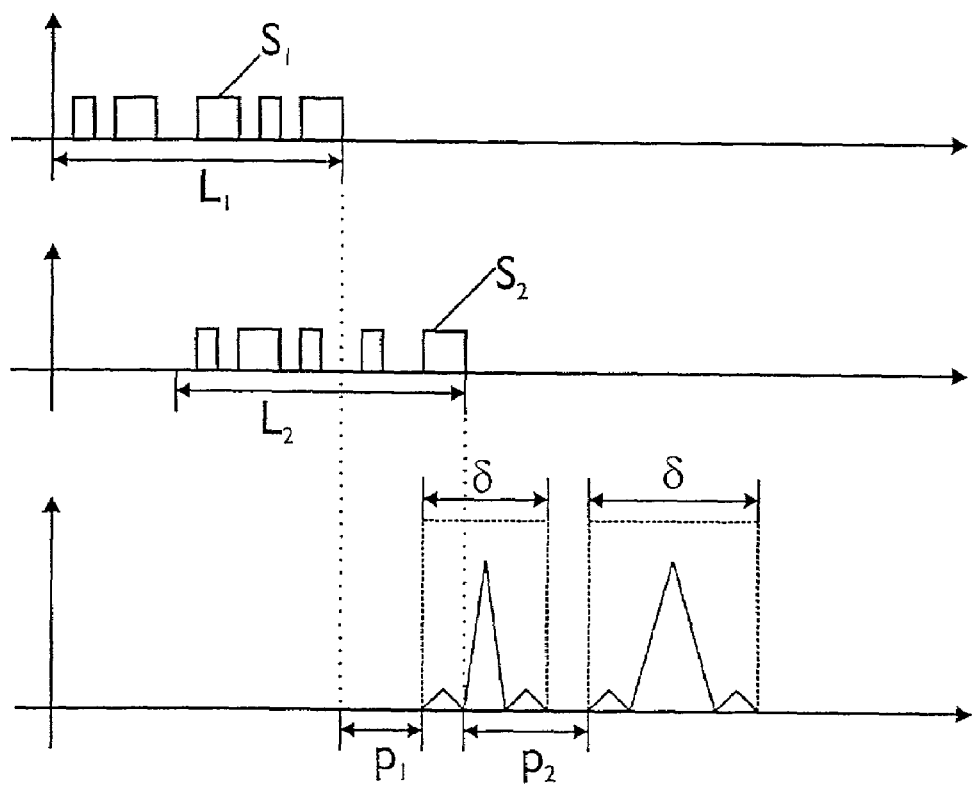

In the drawings:

FIG. 1 shows a wireless network comprising a radio network controller and a plurality of terminals, FIG. 2 shows a layer model to explain various functions of a terminal or of a radio network controller, FIGS. 3 and 4 show sequences of detection windows for a matched filter used in a radio network controller, which matched filter is shown in relation to a reference frame and FIG. 5 shows two exemplary signaling sequences transmitted, for example, by two terminals and the respective detection windows.

FIG. 1 shows a wireless network, for example, radio network, including a radio network controller (RNC) 1 and a plurality of terminals 2 to 9. The radio network controller 1 is responsible for controlling all the components taking part in the radio traffic such as, for example, the terminals 2 to 9. An exchange of control and useful data takes place at least between the radio network controller 1 and the terminals 2 to 9. The radio network controller sets up a respective link for the transmission of useful data.

As a rule, the terminals 2 to 9 are mobile stations and the radio network controller 1 is fixedly installed. A radio network controller 1 may, however, also be movable or mobile, as appropriate.

In the wireless network are transmitted, for example, radio signals in accordance with the FDMA, TDMA or CDMA method (FDMA=frequency division multiple access, TDMA=time division multiple access, CDMA=code division multiple access), or in accordance with a combination of the methods.

In the CDMA method, which is a special code-spreading method, binary information (a data signal) coming from a user is modulated with a respective code sequence. Such a code sequence includes a pseudo-random square-wave signal (pseudo-noise code), whose rate, also called chip rate, is generally considerably higher than that of the binary data. The duration of a square-wave pulse of the pseudo-random square-wave signal is referred to as a chip interval $T_C$. $1/T_C$ is the chip rate. The multiplication or modulation respectively, of the data signal by the pseudo-random square-wave signal has a spreading of the spectrum by the spreading factor $N_C=T/T_C$ as a result, where T is the duration of the square-wave pulse of the data signal.

Useful data and control data are transmitted between at least one terminal (2 to 9) and the radio network controller 1 over channels predefined by the radio network controller 1. A channel is determined by a frequency range, a time range and, for example, in the CDMA method, by a spreading code. The radio link from the radio network controller 1 to the terminals 2 to 9 is referred to as a downlink and from the terminals to the radio network controller 1 as an uplink. Thus data are sent over downlink channels from the radio network controller 1 to the terminals and over uplink channels from the terminals to the radio network controller 1.

For example, a downlink control channel may be provided which is used for broadcasting, prior to a connection setup, control data to all the terminals 2 to 9 coming from the radio network controller 1. Such a channel is referred to as downlink broadcast control channel. For transmitting control data from a terminal 2 to 9 to the radio network controller 1 prior to a connection setup, for example an uplink control channel assigned by the radio network controller 1 can be used which, however, may also be accessed by other terminals 2 to 9. An uplink channel that can be used by various terminals or all the terminals 2 to 9 is referred to as a common uplink channel. After a connection setup, for example, between a terminal 2 to 9 and the radio network controller 1, useful data are transmitted by a downlink and an uplink user channel. Channels that are set up only between one transmitter and one receiver are referred to as dedicated channels. As a rule, a user channel is a dedicated channel which may be accompanied by a dedicated control channel for transmitting link-specific control data. For registering a terminal (2 to 9) with a radio network controller 1, a contention channel is responsible, which will be referred to as a RACH channel (RACH=Random-Access Channel) in the following. It is also possible to send data packets over such a RACH channel, for example, for messages about various statuses (measuring results) inside the terminal.

For exchanging useful data between the radio network controller 1 and a terminal, it is necessary for a terminal 2 to 9 to be synchronized with the radio network controller 1. For example, it is known from the GSM system (GSM=Global System for Mobile communication), in which a combination of FDMA and TDMA methods is used, that after a suitable frequency range is determined based on predefined parameters, the position in time of a frame is determined (frame synchronization), with the aid of which frame the order in time for transmitting data is determined. Such a frame is always necessary for the data synchronization of terminals and radio network controller 1 in TDMA, FDMA and CDMA methods. Such a frame may contain several sub-frames, or together with various other successive frames, form a superframe. For simplicity, a frame which is denoted as a reference frame, is started from in the following.

The exchange of control and useful data via the radio interface between the radio network controller 1 and the terminals 2 to 9 can be explained with the layer model or protocol architecture shown by way of example in FIG. 2 (compare for example $3^{rd}$ Generation Partnership Project (3GPP); Technical Specification Group (TSG) RAN; Working Group 2 (WG2); Radio Interface Protocol Architecture; TS 25.301 V3.2.0 (1999-10)). The layer model comprises three protocol layers: the physical layer PHY, the data link layer having the sub-layers MAC and RLC (in FIG. 2 various objects of the sub-layer RLC are shown) and the layer RRC. The sub-layer MAC is equipped for Medium Access Control, the sub-layer RLC for Radio Link Control and the layer RRC for Radio Resource Control. The layer RRC is responsible for the signaling between the terminals 2 to 9 and the radio network controller 1. The sub-layer RLC is used for controlling a radio link between a terminal 2 to 9 and a radio network controller 1. The layer RRC controls the layers MAC and PHY via control links 10 and 11. By doing this, the layer RRC can control the configuration of the layers MAC and PHY. The physical layer PHY offers transport links 12 to the layer MAC. The layer MAC renders logic connections 13 available to the layer RLC. The layer RLC can be reached by applications via access points 4.

As mentioned earlier, a terminal 2 to 9 transmits data packets over a RACH channel for certain applications (for example, Internet access) as long as the capacity of the RACH channel is sufficient. If the capacity is exceeded or may be expected to be exceeded, the radio network controller 1 causes the terminal 2 to 9 to further transmit these data packets over a dedicated channel and not to use the RACH channel any further.

For measuring the capacity, traffic load measurements of the occupancy levels of the buffers in the various layers (for example RLC layer) take place. These buffers, which are not further shown in FIG. 2, are used for buffering data packets to enable, for example, repetitions of transmissions. If the occupancy level of one or various buffers exceeds a predefined threshold, the radio network controller 1 is informed thereof. The measurement of the occupancy level is performed by a measuring device (not further shown) for capacity measurements. The message that the occupancy level of one or more buffers has exceeded a predefined threshold is sent according to the invention via a signaling sequence to be explained hereinafter. The signaling sequence detected by a radio network controller 1 merely indicates whether the occupancy level of one or more buffers or the sum of the occupancy levels of all the buffers in a terminal 2 to 9 has exceeded a predefined threshold.

From EP 0 967 742 A2 is known that a signaling sequence can be used for transmitting information. Such a signaling sequence is a pseudo-random square-wave signal which is transmitted from a terminal 2 to 9. The radio network controller 1 can, for example during the registration of a terminal 2 to 9 in the network, transfer via a downlink broadcast control channel the signaling sequence to be used and the time (sequence start time) of the transmission of the signaling sequence related to the reference frame. This means that therefore each terminal 2 to 9 is assigned an uplink signaling channel by the base station, for transmitting a signaling sequence over which uplink signaling channel the signaling sequences are transmitted. A signaling channel is thus realized by the determined signaling sequence and its start time and is exclusively assigned to a terminal 2 to 9.

The terminals 2 to 9 may use the same signaling sequence or groups of terminals 2 to 9 may be different signaling sequences. The terminals having the same signaling sequences are differentiated by the radio network controller 1 by the different times (sequence start times).

A radio network controller 1 includes a single matched filter and a peak detector for detecting the signaling sequences transmitted by the terminals. The matched filter is clocked at a clock rate, which is at least equal to the maximum chip rate when a code spreading is used, or equal to the maximum bit rate when no code spreading is used. The terminals transmit the signaling sequences that have a good autocorrelation property. This means that pulses resulting from successive signaling sequences of different terminals on the output of the matched filter can be unambiguously detected by a peak detector within a detection window. The selection of the clock rates in dependence of the maximum chip rate or bit rate respectively, and a signaling sequence having good autocorrelation properties enables that the successive signaling sequences have a minimum distance between their start times. Furthermore, the signaling sequence should have a good cross-correlation property i.e. the correlation to other signals transmitted in the network is to be small. Thus, on the one hand, the other signals transmitted in the network and received from the matched filter are interpreted as a negligible noise signal by the peak detector and, on the other hand, the signaling sequences from other circuit elements in the radio network controller 1, which elements process the other signals transmitted in the network, are interpreted as a negligible noise or interference signal, respectively. Such a signaling sequence with good auto and cross-correlation properties is, for example, the Gold and Kasami sequence known from the title "J. G. Proakis: Digital Communications by J. G. Proakis, third edition, McGraw-Hill International Editions, 1995, pp. 724 to 729".

The pulses showing up at the output of the matched filter are a measure for the energy of the signaling sequences. The length and the low amplitude of the signaling sequence, which low amplitude is in contrast to the other signals to be transmitted, therefore determine the pulse height on the output of the matched filter.

The sequence start time of a signaling sequence should be determined by the base station, so that the matched filter in the base station generates a pulse after the detection of a signaling sequence of one of its assigned terminals in a predefined detection window. This detection window has the duration or length $\delta$.

In principle, the signaling sequences can be transmitted at arbitrary sequence start times. A sequence start time is linked with the occurrence of a pulse on the output of the matched filter. The detection begins after the transmission of a signaling sequence and after a delay caused by the channel property of a link between at least one terminal and a base station. A channel property is understood to be the physical parameters of the channel. A channel property is, for example, the parameter of distance between terminal and base station. Consequently, it is possible for the peak detector to use detection windows of different widths for the various terminals. A uniform width of the detection window is chosen here for simplicity. The sequence of randomly occurring detection windows of duration $\delta$ is shown in FIG. 3 in relation to the reference windows having length FR. The matched filter usually generates from a received signaling sequence a pulse sequence with a main pulse and various sub-pulses, often symmetrically spread around the main pulse. The amplitude of the sub-pulses is often smaller than the amplitude of the main pulse.

The various main pulses generated by the matched filter are to have a sufficient distance (guard time), so that the pulse sequences of the various terminals appearing on the output of the matched filter and distorted by the channel do not overlap, so that no unambiguous detection becomes possible. With a certain overlap, the base station cannot unambiguously assign the pulses to a terminal. The width or duration $\delta$ of the detection window is thus to be at least equal to the width of the main pulse which occurs without channel influence, and be equal to an additional channel-dependent guard time. This also produces the distance of successive, equal signaling sequences. However, the guard time of two different signaling sequences coming from different base stations need not be taken into account, because due to the small correlation, a peak detector connected after the matched filter detects a signaling sequence of another base station or radio zone respectively, as non-disturbing noise.

To transmit as many signaling sequences as possible within a predefined time space, according to the invention there may be an optimized distance between the sequence start times. This means that the width of the detection window is respectively determined in dependence on the channel properties between a terminal and the base station. Another possibility according to the invention, which is simple to realize, is that the signaling sequences are successively transmitted a constant time apart. For determining this constant time, the worst channel properties are to be taken into account. FIG. 4 shows the continuously successive detection windows relative to the reference frames of length FR which appear as a series of signaling sequences transmitted a predefined constant time apart.

FIG. 5 shows two exemplary signaling sequences $S_1$ and $S_2$, which have the sequence duration or sequence length $L_1$ and $L_2$. After a delay $p_1$ and $p_2$ caused by the channel properties, the detection operation or detection window respectively, of length $\delta$ is started. In such a detection window appears a main pulse and sub-pulses assigned to a signaling sequence.

The signaling channel unambiguously determined by signaling sequence and transmit time may be assigned a respective buffer in a terminal to exactly show the exceeding of the occupancy level in this buffer. This means that at most n signaling sequences can be assigned to a terminal that contains n buffers. As a rule, however, it is sufficient for the radio network controller 1 to assign a single signaling channel to a terminal 2 to 9, so that the terminal 2 to 9 shows the exceeding of the threshold of the occupancy level of at least one buffer (the one loaded most) or the sum of the occupancy levels of all the buffers over this signaling channel.

The transmission of a signaling sequence from a terminal 2 to 9 to the radio network controller 1 may be considered a traffic load message. After a terminal 2 to 9 is instructed by the radio network controller 1 to continue the data transmission on a dedicated channel and this channel is used, the terminal 2 to 9 can send further traffic load messages over the dedicated channel. Such a traffic load message sent over the dedicated channel may not only contain the information that the occupancy level has been exceeded, but may contain further information (for example, what RLC object was involved and has caused the traffic load message to be sent).

The advantage of the use of the signaling channel exclusively determined by signaling sequence and transmit time, for the message of an exceeding of the threshold, lies in that fact that clearly fewer data are to be sent to the radio network controller 1. Since the signaling channel is exclusively assigned to one terminal, differently from the use of the RACH channel, there is no need to co-transmit a terminal ID and a number denoting the type of the measured value report in a traffic load message. Determined by the fixed number of bits that can be transmitted over the RACH channel when the possible spreading factors are used and which usually do not exactly correspond to the number of bits that are really to be transmitted, stuff bits are usually to be co-transmitted for the measuring value message, which stuff bits complement the number of bits really to be transmitted to the number of bits that the RACH channel is capable of transmitting with a defined spreading factor. This reduction of the data to be transmitted reduces the interference occurring in a cell. Furthermore, the use of the exclusively assigned signaling channel means a reduction of interference, because no data can be lost as a result of collisions which, however, may occur indeed on an RACH channel. This particularly adds to a faster signaling of the exceeding of the threshold, which in its turn has a favorable effect on the efficient use of the available radio resources. Particularly with the traffic profiles having considerable variations of the data rate, but a value of the mean data rate that can still be transmitted over the RACH channel, there are frequent traffic load messages which are then often followed by an access to the RACH channel and thus cause data loss owing to collisions.

The invention claimed is:

1. A wireless network comprising a radio network controller (1) and a plurality of assigned terminals (2 to 9) for exchanging useful data and control data, which terminals respectively have a buffer for buffering data packets to be transmitted to the radio network controller (1) via a contention channel and a measuring device for measuring the occupancy level of at least one buffer, characterized
   in that a terminal (2 to 9), when an occupancy level of a buffer or various buffers is exceeded, is provided for sending a signaling sequence at a start time predefined by the radio network controller (1),
   in that the radio network controller (1) includes a device for correlating a signaling sequence sent by a terminal (2 to 9) and for detecting the pulse developed from a received and correlated signaling sequence, and
   in that the radio network controller (1), after detecting a signaling sequence assigned to a terminal (2 to 9), is arranged for sending an indication to the terminal (2 to 9) to further transmit the data packets over a channel assigned only to the terminal.

2. A wireless network as claimed in claim 1, characterized in that the channel assigned to a terminal (2 to 9) is a dedicated channel.

3. A wireless network as claimed in claim 1, characterized in that a terminal (2 to 9) is provided for measuring the occupancy level of the buffer or of various buffers in the layer for the radio link control (RLC layer).

4. A wireless network as claimed in claim 1, characterized in that the radio network controller (1) includes a matched filter generating at least one pulse after a signaling sequence has been received and includes a peak detector and in that the peak detector, in a certain detection window whose start time and duration are determined by the channel properties and the start time of a signaling sequence to be detected, is provided for detecting the peak on the output of the matched filter.

5. A wireless network as claimed in claim 1, characterized in that a terminal (2 to 9) is provided for sending a Gold, Kasami or Golay sequence as a signaling sequence at a certain start time.

6. A wireless network as claimed in claim 1, characterized in that a terminal (2 to 9) is provided for sending a signaling sequence at a start time predefined by the radio network controller (1) when a sum of the occupancy levels of all the buffers exceeds a predefined threshold.

7. A wireless network as claimed in claim 1, characterized in that a terminal (2 to 9) is provided for transmitting further information about the traffic load of the terminal (2 to 9) over this user channel after receipt of the indication and a changeover to the assigned channel.

8. A radio network controller (1) in a wireless network for exchanging useful data and control data comprising a plurality of assigned terminals (2 to 9), characterized
   in that the radio network controller (1) includes a device for correlating a signaling sequence transmitted by a terminal (2 to 9) and for detecting the peak evolved from a received and correlated signaling sequence,
   in that a signaling sequence transmitted at a certain time by a terminal (2 to 9) indicates that the occupancy level of the buffer or of various buffers in the respective terminal (2 to 9) has been exceeded and
   in that the radio network controller (1), after detecting a signaling sequence assigned to a terminal (2 to 9), is provided for sending an indication to the terminal (2 to 9) for the further transmission of the data packets over a channel exclusively assigned to the terminal (2 to 9).

9. A terminal (2 to 9) in a wireless network for exchanging useful data and control data with at least one radio network controller (1) and further terminals, which terminal includes at least one buffer for buffering data packets to be transmitted to the radio network controller (1) over a contention channel and a measuring device for measuring the occupancy level of at least one buffer, characterized
   in that the terminal (2 to 9), when an occupancy level of a buffer or various buffers is exceeded, is provided for sending a signaling sequence at a start time predefined by the radio network controller (1) and
   in that the terminal (2 to 9) is provided for receiving an indication from the radio network controller (1) which detects the signaling sequence that a channel exclusively assigned to the terminal (2 to 9) can be used for the further transmission of the data packets.

10. A method of exchanging useful data and control data in a wireless network with a radio network controller (1) and a plurality of assigned terminals (2 to 9) which respectively have at least one buffer for buffering data packets to be transmitted to the radio network controller (1) over a contention channel and a measuring device for measuring the occupancy level of at least one buffer, characterized
    in that a signaling sequence is transmitted by a terminal (2 to 9) at a start time respectively predefined by the radio network controller (1) after an occupancy level of one or more buffers is exceeded,
    in that a signaling sequence transmitted and received by a terminal (2 to 9) is correlated in the radio network controller (1) and the ensuing peak is detected and
    in that an indication for the terminal (2 to 9) to use a channel exclusively assigned to the terminal (2 to 9) for the further transmission of the data packets is transmitted by the radio network controller (1) after the detection of a signaling sequence assigned to a terminal (2 to 9).

* * * * *